US006837303B2

(12) United States Patent
Butler

(10) Patent No.: US 6,837,303 B2
(45) Date of Patent: Jan. 4, 2005

(54) INTERNAL WATER TANK SOLAR HEAT EXCHANGER

(76) Inventor: Barry Lynn Butler, 980 Santa Estella, Solana Beach, CA (US) 92075-1520

( * ) Notice: Subject to any disclaimer, the term of this patent is extended or adjusted under 35 U.S.C. 154(b) by 171 days.

(21) Appl. No.: 10/085,174

(22) Filed: Feb. 27, 2002

(65) Prior Publication Data

US 2003/0159804 A1 Aug. 28, 2003

(51) Int. Cl.[7] ................................................. F28D 1/06
(52) U.S. Cl. ....................... 165/74; 165/132; 165/134.1; 126/640
(58) Field of Search ............................ 165/73, 74, 132, 165/134.1; 126/640, 641; 62/238.6, 238.8

(56) References Cited

U.S. PATENT DOCUMENTS

| 1,768,095 | A | * | 6/1930 | Arthur | 285/382.2 |
| 1,811,277 | A | * | 6/1931 | Mosley | 285/148.19 |
| 4,776,392 | A | * | 10/1988 | Loyd | 165/134.1 |
| 4,865,005 | A | * | 9/1989 | Griffith | 123/546 |
| 4,926,830 | A | * | 5/1990 | McNelley | 123/557 |
| 5,029,634 | A | * | 7/1991 | Hurner | 165/47 |
| 5,438,712 | A | * | 8/1995 | Hubenthal | 4/493 |
| 5,575,276 | A | * | 11/1996 | Fossum et al. | 126/588 |
| 6,142,216 | A | * | 11/2000 | Lannes | 165/70 |

FOREIGN PATENT DOCUMENTS

| GB | 1238712 A | * | 7/1971 | | 165/74 |
| JP | 57-67751 A | * | 4/1982 | | F24J/3/02 |

* cited by examiner

Primary Examiner—Allen Flanigan

(57) ABSTRACT

A heat exchanger which is adapted to an existing water tank to allow it to be heated or cooled using a hot or cold toxic or non-toxic liquid. Solar collectors and heat pumps can provide hot or cold liquids. To transfer this heat cheaply and economically to an existing hot or cold, water tank requires a simple efficient heat exchange, which can be easily adapted to the existing tank. The invention recited fills this need by simply screwing into the existing hot or cold, water tank and allow heat or cold to be added or extracted via a simple fluid loop, which is single wall isolated for non-toxic heat exchange fluids and double wall isolated for toxic heat exchange fluids.

2 Claims, 3 Drawing Sheets

# INTERNAL WATER TANK SOLAR HEAT EXCHANGER

BACKGROUND OF INVENTION

Natural convection internal heat exchangers, single and double walled, for existing hot water tanks. This invention pertains to the input or extraction of heat from an existing storage tank, which is plumbed into an existing "city" pressure water system for home or industrial use. Heat is transferred from a heated or cooled fluid in a separate heat transfer loop, which is not pressurized by "city" water pressure and must be separated from it by one or two walls to prevent contamination.

If the heated or cooled fluid is non-toxic, the single wall isolation from potable water is acceptable. If the heated or cooled fluid is toxic, then double wall isolation from potable water is needed. This invention allows an existing hot water tank to be adapted for heating by a solar energy heated fluid or a heat pump heated fluid, without modifying the existing tank except by placing an adapter between it and an output water line at "city" pressure. This use of an existing tank can help to reduce the cost of solar hot water heating and heat pump hot water heating. The adapter could also be placed on the coldwater inlet, water drain port or other water tank standard port.

PRIOR ART

The most common liquid to existing tank heat exchangers are external pumped or natural convection. The external pumped heat exchangers pump water from the tank past the heat exchanger and return it to the tank. This is efficient, but requires plumbing and a pump and control electronics. External pumped heat exchangers disturb the tanks normal stratification, hotter on top, cooler on bottom. External convection heat exchangers eliminate the pump, but not the plumbing. In addition, the plumbing required to keep the convection loop working requires the buoyancy difference between hot and cold water to drive it. The flow resistance in piping is small, but so are the buoyancy forces. Hence, heat transfer is less efficient. Special tanks with built-in heat exchangers such as the one recited here can be built. However, this requires that the existing tank be replaced in order to accommodate an internal heat exchanger. Many tanks are in use and have long, 20 year, life expectancies. The recited invention can be screwed onto or fitted into any existing tank and provide it with liquid-to-liquid heat exchange capability.

The invention allows any hot or cold water tank fitted with standard pipe threaded outlets/inlets to be used as a source or sink for toxic heat exchange fluids, while meeting USA Building and Plumbing Codes for double wall separation of toxic fluids and potable water. (If the heat transfer fluid is non-toxic then only one wall would be needed and tube (3) (FIG. 1) could be eliminated). Heat exchangers of the internal tank type are preferred for solar collectors and liquid to air heat pumps. The invention recites that all heat exchanger plumbing is within the hot water tank so all heat leaving or entering the exchanger goes to or comes from the hot water tank. Externally plumbed heat exchangers must be insulated well to avoid heat loss to the surrounding air. They need two connections to the tank and a plumbing system. Natural convection systems are much less efficient. Pumped external heat exchangers are more efficient than natural convection, but less efficient than in-tank units. However, the pump costs a lot more and disturbs the tank's natural stratification. Natural convection internal and external heat exchangers preserve the tank's natural stratification. It is important not to disturb the normal tank stratification, because it decreases the normal gas or electric heater efficiency. Main advantages of this invention are: 1) adapts to existing tanks with minimum re-plumbing and without tank removal or draining; 2) is efficient; 3) safely separates toxic heat transfer fluids from potable water; 4) costs less to install and maintain; and 5) maintains normal tank stratification.

SUMMARY OF INVENTION

In summary, the present invention is a heat exchange adapter that can be screwed into the standard pipe fitting on existing line pressurized water tanks. This heated/cooled liquid is pumped through the in tank heat exchanger, which is surrounded by tank water and transfers heat to the tank via conduction through the heat exchanger walls and then natural convection. The heated/cooled liquid is connected to the adapter fluid lines and pumped into the in tank heat exchanger and then back out of the tank. The heat exchanger adapter may reduce the plumbing water flow, which the tank can provide by up to 50% in gallons/minute. Water conservation measures like low flow showerheads and appliances have reduced hot water consumption, so the reduction in flow may not be noticeable by the homeowner.

The primary objective of the present invention is to allow existing water tanks to be adapted to take solar heating and heat pump heating, without moving or removing the tank for retrofit.

Another objective is to reduce the time and complexity of retrofitting solar energy to existing homes with a hot water tank in place.

Additional objectives, advantages and novel features of the invention will be set forth in part in the description which follows and in part will become apparent to those skilled in the art upon examination of the following. In particular the heat exchanger tubing geometries may be spiraled or formed differently, but are still included it this patent. Others may be learned by practice of the invention. The objectives and advantages of the invention may be realized and attained by means of the instrumentalities and combinations particularly pointed out in the appended claims.

DETAILED DESCRIPTION OF THE PREFERRED EMBODIMENT

Figure 1:
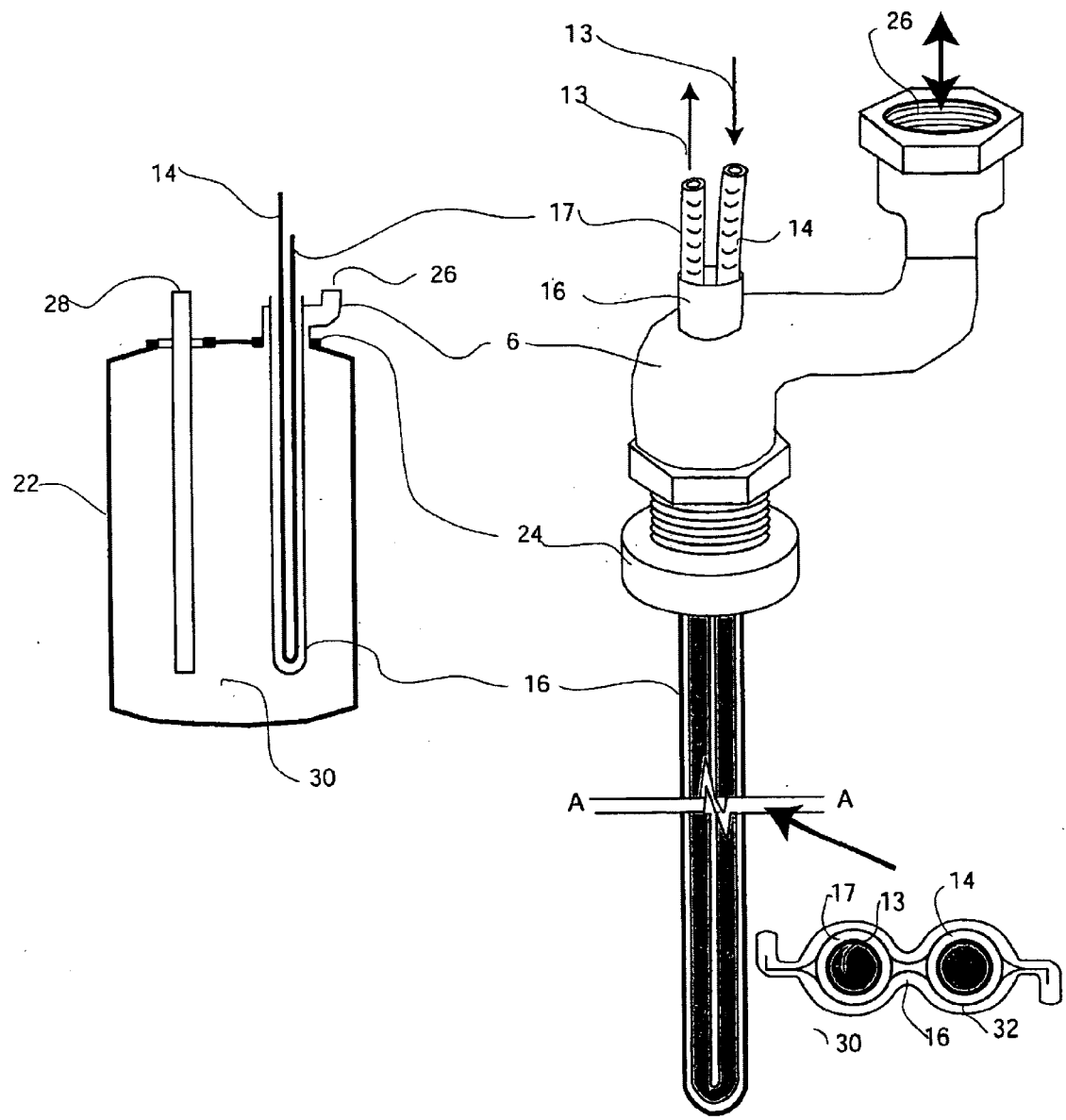
FIG. 1 is a perspective view of the heat exchange adapter showing the tank fitting and new tank input or output and the heating/cooling fluid connections.

The invention consists of a screw in T-adapter, which replaces the hot water outlet or coldwater inlet lines. (FIG. 1) The water exits (or enters) the tank now via a side arm of the adapter (0). Toxic heating or cooling fluid (1), flows in a small tube (2), which goes into the tank and returns encased in a second tube labeled (3). Inside the tank, the tube labeled (3) has been collapsed about the toxic fluid carrying tube labeled (2). Heat is conducted between the toxic heat exchange fluid to or from the potable water. Because of the double wall design, toxic fluid leaking from tube (2) will not reach the potable water. If a leak of potable water occurs, it is at high pressure and would again be leaked outside the tank between tubes (2) and (3). This assures no chance for contamination of potable water with toxic heat transfer fluids, even if the heat transfer fluid is under high pressure. A leaking heat exchanger would be replaced. Note that tubes (2 & 3) are configured to fit through the female pipe threaded tank fitting, labeled (4).

Figure 2:
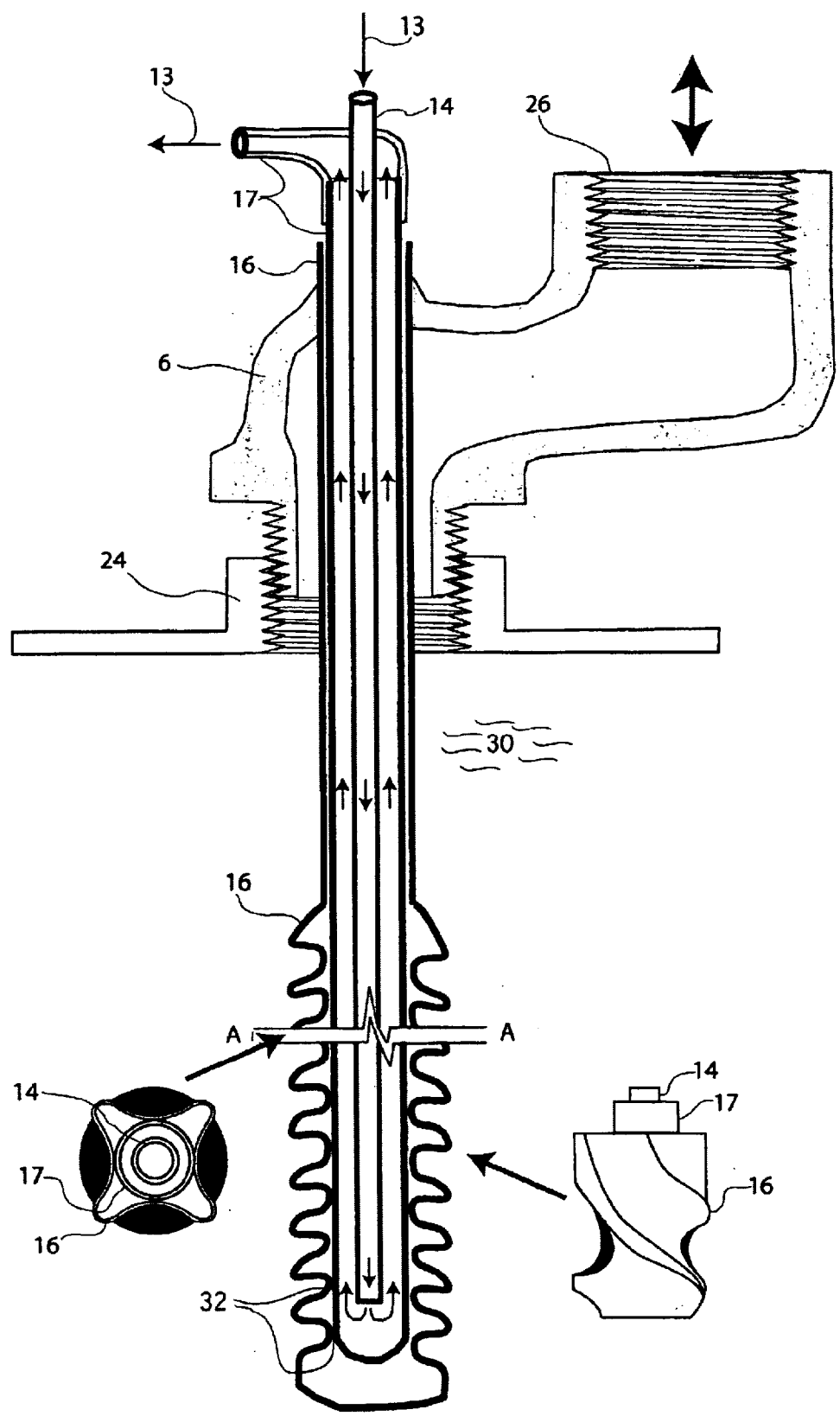
FIG. 2 is a cutaway view of the double wall heat exchanger cross section.

The cross section of the double wall heat exchanger (FIG. 2-A) shows potable water (5), on the outside, tube (3), collapsed around heat transfer tubes (2). The interface (6) between tubes (2) and (3) is a mechanical one, which transfers heat by areas of metal to metal contact with metal oxides or other heat conducting spacer at the metal to metal interface forming fluid flow channels. Liquid is free to move along interface (6), and fluid leaking from either tubes (2) or (3), will move along interface (6) and overflow out of the top of FIG. 1 coupling (7). FIG. 2-B shows some of the possible variations of how toxic fluid tubes (2) can be constructed and possible variations of how the second wall tube (3) can be collapsed to contact the toxic fluid tubes (2).

Figure 3:
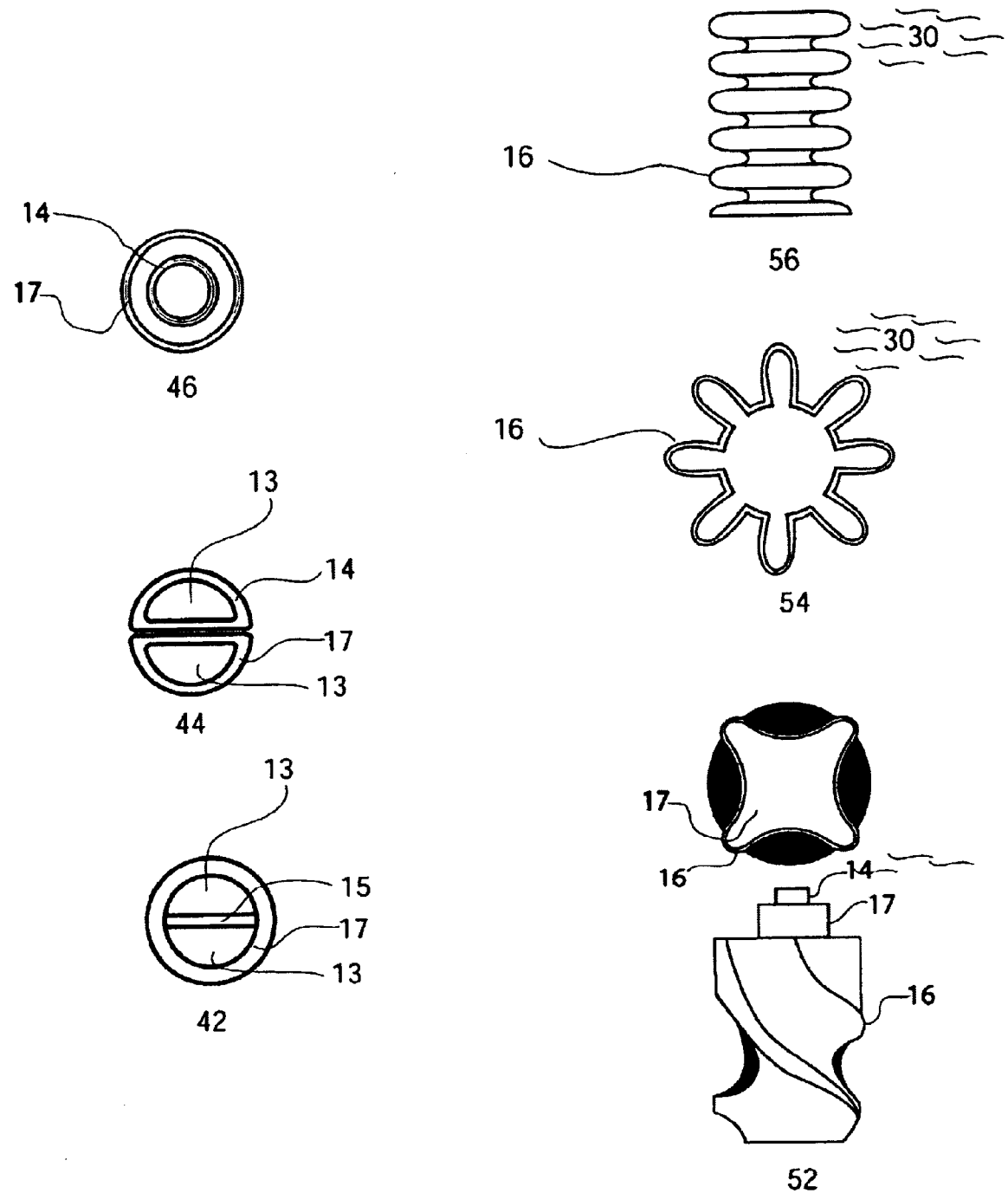
FIG. 3 is a cutaway view of a single wall heat exchanger cross section.

A single wall heat exchanger configuration is shown in FIG. 3. The cross section of the single wall heat exchange shows potable water (5), on the outside, tube (3), and Non-toxic heat transfer fluid (1a), inside tube (3). This is a less complicated heat exchange system.

The potable water (5) surrounds the heat exchange tubes (2). A leak of non-toxic heat transfer fluid into the potable water is not dangerous. A leak of water in the heat (6) between tubes (2) and (3) is a mechanical one, which transfers heat by areas of metal to metal contact with metal oxides or other heat conducting spacer at the metal to metal interface forming fluid flow channels. Liquid is free to move along interface (6), and fluid leaking from either tubes (2) or (3), will move along interface (6) and overflow out of the top of FIG. 1, coupling (7). FIG. 2-B shows some of the possible variations of how toxic fluid tubes (2) can be constructed and possible variations of how the second wall tube (3) can be collapsed to contact the toxic fluid tubes (2).

A single wall heat exchanger configuration is shown in FIG. 3. The cross section of the single wall heat exchange shows potable water (5), on the outside, tube (3), and Non-toxic heat transfer fluid (1a), inside tube (3). This is a less complicated heat exchange system.

The potable water (5) surrounds the heat exchange tubes (2). A leak of non-toxic heat transfer fluid into the potable water is not dangerous. A leak of water in the heat transfer system will cause an overflow. Either way the leak will quickly be detected and a new heat exchange adapter installed.

What is claimed is:

1. An insertable double wall, in-tank heat exchange adapter for existing water tanks, comprised of a heat exchanger having a tubular element, an inlet, and an outlet defining a flow path for heat exchange fluid; an adapter on which said heat exchanger is mounted; said adapter having a male threaded portion surrounding an open port through which said heat exchanger extends adapted to screw into a threaded port provided on a water tank; and an outlet/inlet port provided on the adapter surrounded by a complementary female (or male) threaded portion which matches the male threaded portion and communicates with the open port to allow the supply or withdrawal of fluid to or from the tank when the adapter is connected thereto.

2. An insertable heat exchanger according to claim 1 which has double isolated heat exchange fluid tubes and a path for all leaking water or heat exchange fluids to exit outside of the water tank.

* * * * *